Dec. 5, 1933.  R. PUTNAM  1,937,842
STATIC GROUNDER FOR TANK TRUCKS
Filed March 26, 1932
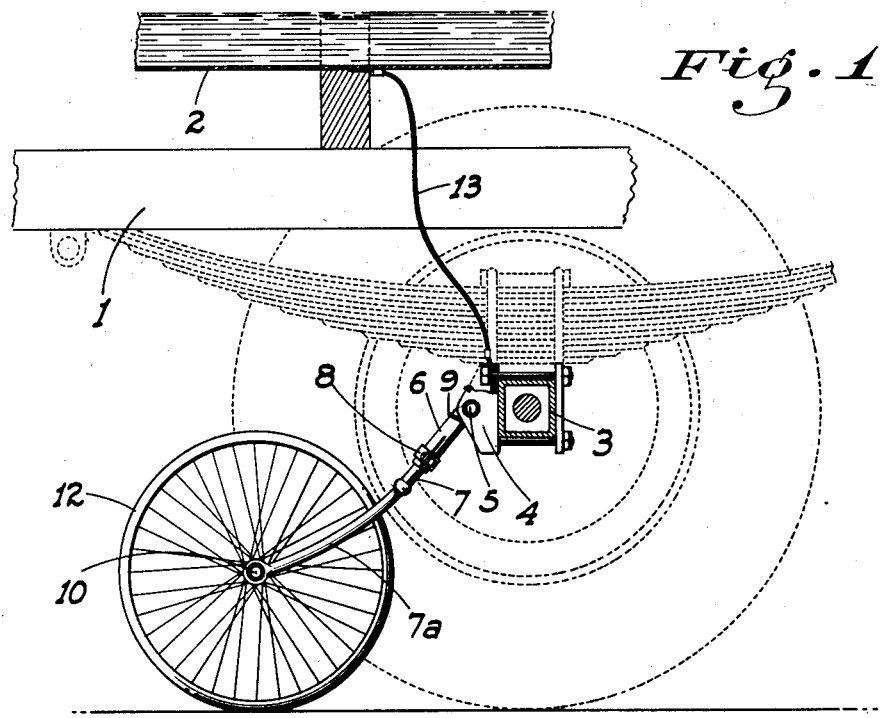
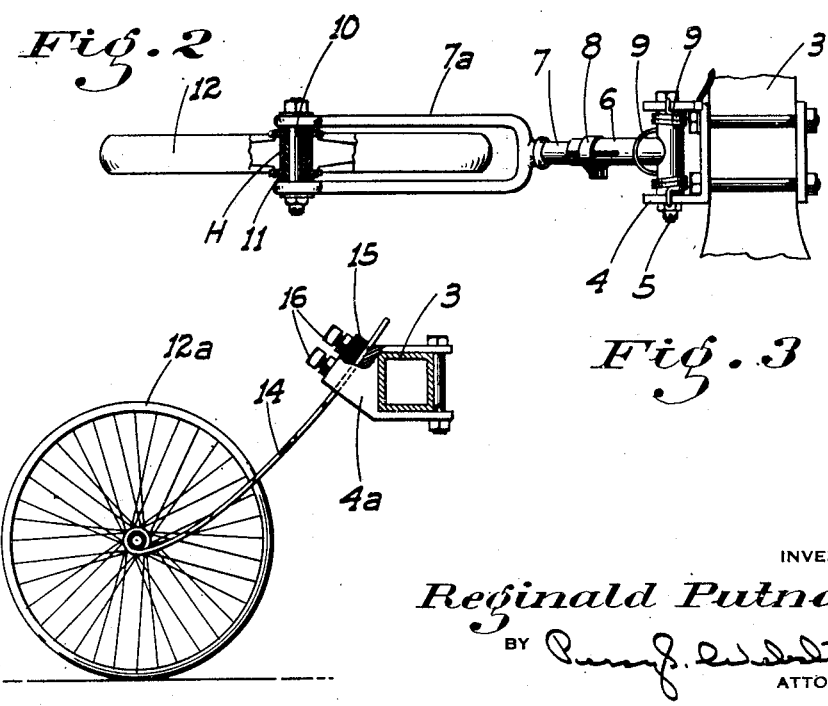
INVENTOR
Reginald Putnam
BY
ATTORNEY Patented Dec. 5, 1933

1,937,842

UNITED STATES PATENT OFFICE 1,937,842

STATIC GROUNDER FOR TANK TRUCKS

Reginald Putnam, Tracy, Calif.

Application March 26, 1932. Serial No. 601,444

3 Claims. (Cl. 175—264)

This invention relates to static grounding devices for rubber tired motor vehicles designed to carry explosives such as inflammable liquids; and particularly to tank trucks such as are used in transporting gasoline from the main supply deposit to the various retail dispensing stations.

As is well known the constant agitation of the liquid in the tank due to the movement of the truck generates static electricity, and also a certain amount of high explosive air and gas mixture within the tank. Unless the electricity is carried away to the ground—which the wheels of the truck cannot do on account of the now universal use of rubber tires for such vehicles—there is always a constant danger of a spark being formed which of course would explode the tank.

The presence of this hazard is recognized and such trucks are therefore equipped with a static grounding attachment. Such attachment is in the form of a dangling chain hung so as to freely contact with the ground. The chain not only wears out very quickly so that it must be frequently adjusted and replaced, but on account of its very nature it does not remain in constant contact with the ground when the truck is traveling at any speed. Instead the ground engaging link or terminal of the chain intermittently rebounds from the ground and frequently such rebounding causes the chain to be hung up on some part of the chassis of the vehicle unknown to the driver. When this occurs the chain of course ceases to function as a grounding device and the explosion hazard is again present.

The principal object of my invention is to avoid the objectionable and dangerous features of the present form of mounting attachment by providing one which will make constant contact with the ground at all times; which will wear for a long time without any replacements being necessary; and which will never require any adjustments while in operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a fragmentary longitudinal section of a tank truck showing one form of my static grounder mounted thereon.

Fig. 2 is a top plan view of the grounder.

Fig. 3 is a side elevation of a modified form of grounder.

Referring now more particularly to the characters of reference on the drawing, and particularly at present to Figs. 1 and 2, the numeral 1 denotes the side frames of a gasoline truck on which the explosive carrying tank 2 is mounted in the usual manner. While I may mount the static grounder on the frame I preferably support the same from the rear wheel axle 3, since this axle has practically no vertical movement relative to the ground whereas the frame has such movement on account of its spring suspension.

The grounder comprises a bracket 4 suitably strapped against the back side of the axle 3, a convenient place being just inwardly of one of the springs, so that the grounder is near the adjacent wheel and is protected to a certain extent thereby. This bracket supports a horizontal transversely extending pivot pin 5 on which is mounted a downwardly and rearwardly extending split sleeve 6. The upper arm 7 of a fork member is slidably mounted in the sleeve, said member extending downwardly and rearwardly. A clamp 8 about the sleeve pinches the same about the arm and holds the latter rigidly in any adjusted position. A spring 9 between the bracket and sleeve acts to exert a constant but yielding downward pressure on the latter, so that the lower end of the arm member is pressed toward the ground.

The forks 7a of the arm member support a removable spindle 10 which engages the bearing bushing 11 of the hub H of an all metal wheel 12 of suitable character and as large as practicable. The spindle is preferably of steel while the bushing is of bronze so that a long wearing unit is provided. The length of the supporting arm is such that the wheel 12 is mainly protected from the outside by the adjacent wheel of the truck. The tread of the wheel is convex in cross section so that there is no tendency for the edges of the same to bite into the roadway.

All parts of the grounder are of metal having good electrical conductivity. In some trucks the necessary conductivity is provided between the tank and the rear axle by the constructional features of the truck itself. If such conditions are lacking, or to make the same more positive in any case, I may run a conducting wire 13 directly between the tank and the bracket 4, as shown in Fig. 1. By means of this device it will be seen that the wheel maintains constant contact with the ground at all times, wear is reduced to a minimum and the degree of pressure of contact with the ground may be altered to suit, or adjustments made according to the height of the axle from the ground by sliding the arm 7 in or out of the sleeve 6.

In Fig. 3 the rigid pivoted arm and spring assembly is replaced by a spring-leaf arm 14 which supports the wheel 12a in the same manner as before. The upper end of the arm slidably projects through a slot 15 in the bracket 4a, being adjustably clamped against movement in the bracket by set screws 16 or the like. In this case also the spring tension is made adjustable by adjusting the arm in the bracket. In either case replacement of the wheel, the bushing or the spindle if necessitated by wear is easily performed with a minimum of expense and time.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In combination with a motor vehicle of a type to carry explosives, a static grounding device comprising a bracket secured on a part of the vehicle, an arm supported from the bracket and depending thence rearwardly and downwardly, a ground engaging element supported from the lower end of the arm, spring means acting on the arm to maintain the element constantly but yieldably engaged with the ground, and means to alter the operative length of the arm between its lower end and the bracket.

2. In a motor vehicle of a type to carry explosives, a static grounding device comprising a bracket secured on a part of the vehicle, a spring arm fixed at one end on the bracket and thence downwardly and rearwardly, and a ground engaging wheel journaled in connection with the lower end of the arm.

3. A static grounding device for a motor vehicle comprising an arm, means to mount the arm on a part of the vehicle so that said arm will extend downwardly and rearwardly from the part, a ground engaging conducting wheel turnably mounted on the lower end of the arm, and spring means acting on the arm to maintain the wheel constantly but yieldably engaged with the ground.

REGINALD PUTNAM.